United States Patent Office 3,155,015
Patented Nov. 3, 1964

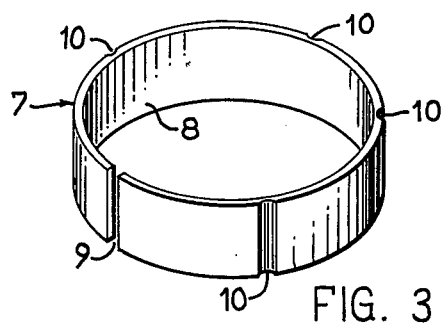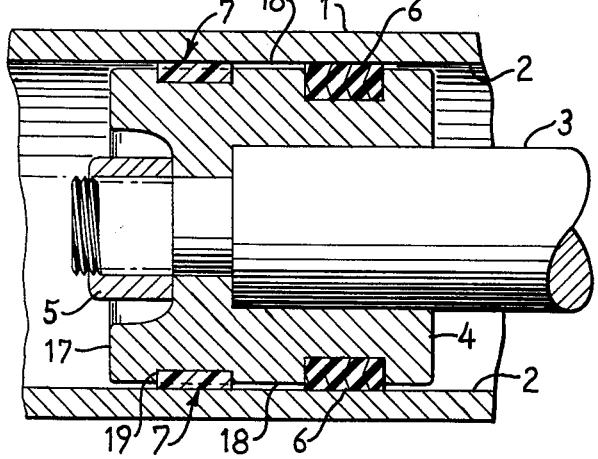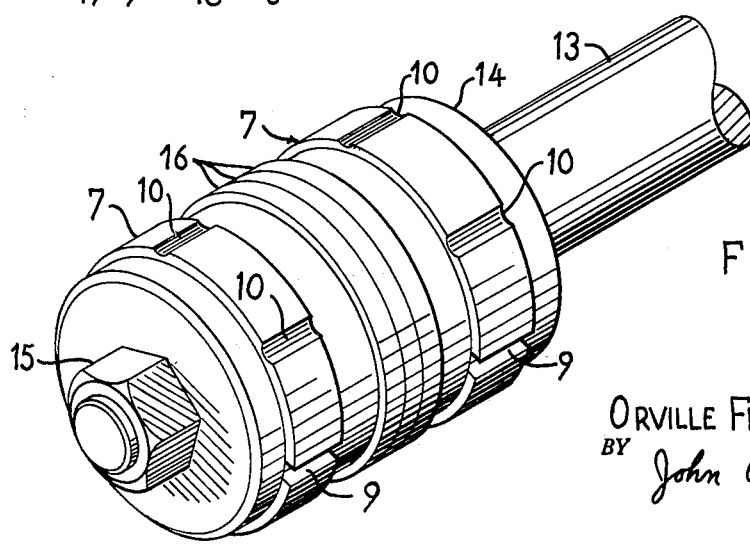

3,155,015
PISTON BEARING-REINFORCED PLASTIC
WEAR RING
Orville Ferdnand Genz, Elmwood Park, Ill., assignor to
Garlock, Inc., Palmyra, N.Y., a corporation of New
York
Filed Jan. 30, 1961, Ser. No. 85,932
4 Claims. (Cl. 92—249)

This invention relates to pistons for movement within a cylinder, and more specifically to a wear ring for a piston.

In the art of fluid motors there exists a real problem as to the disposition of a piston within a cylinder whereby maximum efficiency of the piston may be realized without a corresponding high rate of wear of the piston or of means associated with the piston and in contact with the cylinder wall within which the piston is operatively disposed.

One such means associated with the piston is the conventional sealing means employing packing rings or the like to effect a compression effect within the cylinder responsive to movement of the piston therein. Another such means is the wear ring, which has for a purpose to suspend the piston coaxially within the cylinder for two main reasons: firstly, to function as the chief wear-absorbing member of a piston assembly and secondly, to cause the sealing means to be evenly disposed against the inner wall of the cylinder.

Conventional wear rings have been formed which, during the operation of the cylinder, expose a continuous edge or face to the fluid operating medium of the cylinder, except for a slot formed at one place in the ring in the case of a split, one-piece ring. Such concepts have a deleterious effect in operation, especially where the motive fluid is hydraulic fluid or the like. It is well known that motive fluid erodes the edges and surfaces of conventional wear rings at a high rate, requiring frequent replacement of the rings. This condition is due to a shear plane at the intersection of the wear ring edge and the cylinder wall during motion of the piston and ring. The molecules of motive fluid tend to "pile up" at this intersection and seek an escape channel against the wear ring, and thus tend to erode the edges of same, thus fighting the movement of the piston. Consequently, heat is produced, and a high rate of wear is induced incident to the resultant expansion of the wear ring against the cylinder wall and erosion of the wear ring by the motive fluid. It is important to note that, as the shear plane occurs and the ring heats up, the ring tends to expand against the cylinder wall, and an undesirable combination ring effect occurs. The conventional wear ring in this state tends to perform a sealing function due to the resultant "scraping" action against the cylinder wall.

It is therefore a main object of this invention to provide a wear ring for a fluid operated cylinder piston wherein the wear ring performs a true bearing function only.

Another important object is to provide a wear ring which breaks up the shear plane of motive fluid, whereby the resistance to the motive fluid is reduced during the movement of the piston.

Another important object is to provide a wear ring which is adapted to resist expansion against the cylinder wall during operation of the piston.

Another object of the invention is to provide a wear ring having a long life, thus minimizing the requirement for frequent overhaul of the cylinder and the incident "down time" thereof.

In carrying out the objects of the invention, there is provided a wear ring disposed in suitable means around the periphery of a fluid motor piston, wherein the ring is formed with means for breaking up the shear plane of motive fluid to subsequently cause the fluid to maintain the ring tightly against the piston.

Other advantages and features will become manifest from the following detailed specification, when read with reference to the accompanying drawing, in which:

FIGURE 1 is a sectional view of a portion of a fluid operated cylinder, showing a piston therein on which is disposed one embodiment of the invention.

FIGURE 2 is a perspective view of a piston for a fluid operated cylinder embodying the invention.

FIGURE 3 is a perspective view of a wear ring formed according to the principles of the invention.

In FIGURE 1 there is shown a substantially conventional piston 4 disposed within the fluid operated cylinder 1, and mounted on the end of a piston rod 3 by means such as a threaded nut 5 or the like. The entire structure is not shown, since such cylinders are well known in the art. However, it will be assumed that the cylinder 1 is of the type normally associated with a source of fluid under pressure and such devices incident to the direction of such fluid (not shown) into the chamber of the cylinder for moving the piston 4 and rod 3 to perform work. Such fluid motors are employed on trucks, tractors, lifting devices, baling machinery, and a myriad of other machines requiring reciprocating or direct line motive power. It is also understood that, in this embodiment, fluid under pressure is normally directed against the face 17 of the piston 4 to move the piston 4 in the cylinder 1. Upon completion of the stroke, means (not shown) may be employed to return the piston 4 to the initial position for another stroke. To seal the piston 4 against the inner wall 2 of the cylinder 1, there is provided a conventional sealing means in the form of packing rings 6, which prevent the passage of motive fluid between the piston 4 and the cylinder wall 2.

Means in the form of an annular groove 19 or the like is provided for having disposed therein, or for otherwise carrying a wear ring 7, forming the subject of this invention.

FIGURE 2 illustrates in perspective an embodiment of a piston 14 which is mounted on a piston rod 13 by suitable means such as a threaded nut 15 for being disposed within a cylinder, not shown. Packing rings 16 are provided in the conventional manner. However, in this embodiment, two wear rings 7 are employed. It will become apparent that this embodiment of a piston combination is normally employed in a double-acting cylinder. That is to say, a piston according to FIGURE 2 is adapted for fluid pressure actuation from either end thereof, and is therefore adapted for movement from either end of the cylinder, not shown, under power.

FIGURES 2 and 3 best illustrate the features of the invention, with reference also being made to portions of FIGURE 1. The wear ring 7 may preferably be formed as an annular ring of suitable cross section for being carried in the annular, circumferential ring-receiving groove 19 of the piston. The ring 7 is best described as being a split ring due to the split 9 formed therein. The inside diameter of the ring 7 should be slightly greater than the diameter of the groove 19 in which the ring is carried; while the outside diameter of the ring should be so as to provide a snug fit with the cylinder wall 2 when the piston is static. Ring 7 is so manufactured as to have an involute form.

Formed in the outside surface of the ring 7 are a number of spaced longitudinal grooves 10. While it may be preferred in certain applications to form the grooves 10 parallel to the axis of the ring 7 and the piston; it is to be understood that other applications may make it preferable to dispose the grooves 10 other than as illustrated herein.

It has been found that the ring 7 should be formed from a non-metallic material. Preferably, the ring 7 should be made of a reinforced plastic material such as is exemplified by nylon, Teflon, and the like. By reinforced plastic, it has been determined that a ring formed of a plastic material in which unoriented glass fibers are present retains many desired characteristics such as low coefficient of expansion, low flow point, extremely low rate of wear, and resistance to the deleterious effects of alkyds and other substances found in conventional motive fluids. It may be assumed for the purposes of discussion that the motive fluid for which the illustrated embodiment of the ring 7 is formed is hydraulic fluid, although pneumatic applications are also contemplated herein. In any event, the ring 7 should be formed from a non-metallic material such as plastic reinforced with unoriented glass fibers.

It has also been found that by forming the spaced longitudinal grooves in the surface of the ring 7, a true bearing effect is the result. To this end, the operation of the embodiment of FIGURE 1 will be described with reference also to FIGURES 2 and 3. It will be assumed that the piston 4 is positioned in the cylinder 1 at the end thereof to the viewer's right, and that the piston 4 is beginning its return stroke, not under power, to the left end of the cylinder to begin a new power stroke. It will be apparent that the piston must also move fluid (not shown) ahead of it and out of the chamber of the cylinder. As the pitson 4 moves from right to left (at times with great speed), the piston 4 is suspended coaxially within the cylinder 1 by the wear ring 7 bearing against the cylinder wall 2. As a shear plane builds up adjacent to the leading edge of the ring 7, the fluid, and any impurities which may be suspended therein, is funneled or channeled through the spaced grooves 10 and the split 9 past the wear ring 7 to the space 18 which exists before the packing rings 6. The packing rings 6 prevent the leakage of fluid past the piston, and the operation of the rings 6 is made more efficient by the coaxial suspension of the piston by the ring 7. Thus, the piston 4 does not rest its weight on the packing rings 6, but on the wear ring 7. As the piston 4 moves through the cylinder, the flow of fluid through the grooves 10 creates a small amount of pressure within the grooves, which pressure is exerted against the cylinder wall 2 and the surface of the grooves 10. This pressure, which is additional to the pressure of the fluid normally present in the cylinder, tends to compress the ring 7 against the carrier groove 19 in which the ring is disposed. That is to say, the ring 7, during movement of the piston 4 in the cylinder 2, is caused to "hug" the piston 4 due to the pressure of fluid in the grooves 10. Since fluid tends to hug the wall 2, or otherwise cling to the surface of the cylinder wall 2, the shear plane at the intersection of the leading edge of the ring 7 and the cylinder wall 2 has no deleterious effect on the ring 7 because the ring 7 does not expand against the wall 2, but tends to hug the piston 4 on which it is mounted. The bearing function of the ring 7 is thus increased in efficiency in that the fluid pressure in the grooves 10 tends to more perfectly guide the piston 4 during its movement through the cylinder. Corrosion and erosion of the ring 7 is also minimized during the movement of the piston 4 because the pressure in the grooves 10 forces the ring 7 to hug the piston and ride on the fluid more so than on the cylinder wall 2. Thus, the motive fluid is funneled through the grooves, preventing the tendency of the fluid to fight the movement of the piston.

At the beginning of another power stroke, fluid is introduced into the cylinder 2 against the face 17 of the piston 4. The fluid initially flows through the grooves 10 with pressure against the packing rings 6, starting the movement of the piston. As the piston moves, the fluid flow through the grooves 10 creates the effect of the suspension as described above, with the following variation. During the power stroke, it would appear that the fluid would flow out of the space 18 and thus detract from the suspension of the ring 7 in the cylinder. However, due to the fact that the fluid is also being forced into the cylinder 2 under pressure by means (not shown) to force the piston 4 from left to right, the pressure in the grooves 10 is built up as described above, except from either side of the ring 7, and the objects of the invention are therefore carried out.

The operation of the rings 7 in the piston according to FIGURE 2 is the same as described above. However, it will be apparent that each ring 7 in FIGURE 2 operates as an entity.

The features of the invention are thus apparent that there is provided in combination with a piston for a fluid motor, a wear ring comprising a split ring disposed in a groove means in the piston, and wherein the ring is formed with longitudinal grooves through which the motive fluid is adapted to flow under pressure to force the ring tightly against the piston and minimize wearing of the ring while at the same time causing the piston to be suspended coaxially within the cylinder. The grooves 10 set up or create a controlled flow pattern of the fluid, breaking up the shear plane of the fluid against the leading edge of the ring 7 during movement of the piston 4. Thus also, the fluid does not erode the edge of the ring and does not fight the movement of the ring against the cylinder wall 2. The ring 7 therefore fails to assume a sealing function due to expansion outwardly; but assumes a true bearing and suspension function due to being forced inwardly, and takes any bearing function load away from the sealing or packing rings. The flow of fluid, and any impurities which may be present therein is through the grooves of the ring 7, and scoring of the cylinder wall is minimized along with the incident leakage and malfunction.

The employment of reinforced non-metallic plastic with the unoriented glass fibers therein contributes to the long life and controlled operation of the wear ring 7 according to the principles of this concept.

An embodiment having been described and shown herein, it is to be understood that the foregoing is for the purpose of illustration only, the invention to be construed according to the true spirit and scope of the appended claims.

I claim:

1. A piston for fluid pressure cylinder, sealing means disposed on the piston, an annular groove formed around the piston between said sealing means and a source of fluid pressure in a cylinder, and a wear ring carried by the groove, the inside diameter of said wear ring being greater than the diameter of the groove, said wear ring having formed therein spaced longitudinal grooves in which fluid pressure is adapted to force said ring against said piston.

2. A piston for a fluid pressure cylinder, sealing means disposed on the piston, an annular groove formed around the piston between said sealing means and a source of fluid pressure in a cylinder, and a wear ring formed of non-metallic material carried by the groove, the inside diameter of said wear ring being greater than the diameter of the groove, said wear ring having formed therein spaced longitudinal grooves into which fluid pressure is adapted to flow.

3. Apparatus according to claim 2, said non-metallic material comprising a plastic reinforced with unoriented glass fibers.

4. A piston for a fluid pressure cylinder, sealing means disposed on the piston, an annular groove formed around the piston between said sealing means and a source of fluid pressure in a cylinder, and a wear ring formed of plastic material reinforced with unoriented fibers carried by the groove, the inside diameter of said wear ring being greater than the diameter of the groove, said wear ring being formed with longitudinal grooves in the outer surface thereof.

References Cited in the file of this patent

UNITED STATES PATENTS

| | | |
|---|---|---|
| 2,400,091 | Alfthan | May 14, 1946 |
| 2,569,778 | Phillips | Oct. 2, 1951 |
| 2,615,769 | Barnes et al. | Oct. 28, 1952 |

FOREIGN PATENTS

| | | |
|---|---|---|
| 123,352 | Great Britain | Feb. 27, 1919 |